United States Patent
Ruhlander et al.

(10) Patent No.: US 7,779,720 B2
(45) Date of Patent: Aug. 24, 2010

(54) COMPACT CORE ADJUSTER WITH VIBRATION DAMPENING

(75) Inventors: Gregory P. Ruhlander, Hannibal, MO (US); Donald G. Gordy, Moberly, MO (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 947 days.

(21) Appl. No.: 11/405,395

(22) Filed: Apr. 17, 2006

(65) Prior Publication Data
US 2006/0230868 A1     Oct. 19, 2006

Related U.S. Application Data

(60) Provisional application No. 60/672,336, filed on Apr. 18, 2005.

(51) Int. Cl.
*F16C 1/10*     (2006.01)
(52) U.S. Cl. .................................................. 74/502.4
(58) Field of Classification Search ................ 74/500.5, 74/501.5, 502.4, 502.6; 403/326, 327; 385/56, 385/76
See application file for complete search history.

(56) References Cited
U.S. PATENT DOCUMENTS

| | | | |
|---|---|---|---|
| 4,887,930 A | 12/1989 | Chaczyk et al. | |
| 5,359,909 A | 11/1994 | Ito et al. | |
| 5,394,770 A | 3/1995 | Boike et al. | |
| 5,598,743 A | 2/1997 | Yasuda | |
| 5,605,074 A * | 2/1997 | Hall et al. | 74/502.6 |
| 5,673,596 A | 10/1997 | Lu | |
| 6,085,610 A * | 7/2000 | Gabas et al. | 74/501.5 R |
| 2004/0037624 A1 | 2/2004 | Gordy et al. | |

FOREIGN PATENT DOCUMENTS

EP     0499531 A     8/1992

* cited by examiner

*Primary Examiner*—Vicky A Johnson
(74) *Attorney, Agent, or Firm*—Gifford Krass Sprinkle Anderson & Citkowski P.C.; Kevin S. MacKenzie; Dean B. Watson

(57) ABSTRACT

A core adjuster assembly includes an adjuster body having a pin engagement end and a locking end. The adjuster body has a central longitudinal bore and a lock cavity formed through an outer peripheral surface. A slider body is formed on an end of a rod and is disposed in the central longitudinal bore of the adjuster body. A primary lock member is disposed in the lock cavity and is moveable from a shipping position to a locked position. A secondary lock member is associated with the adjuster body and the primary lock member and is adapted to maintain the primary lock member in the shipping and locked positions.

20 Claims, 16 Drawing Sheets

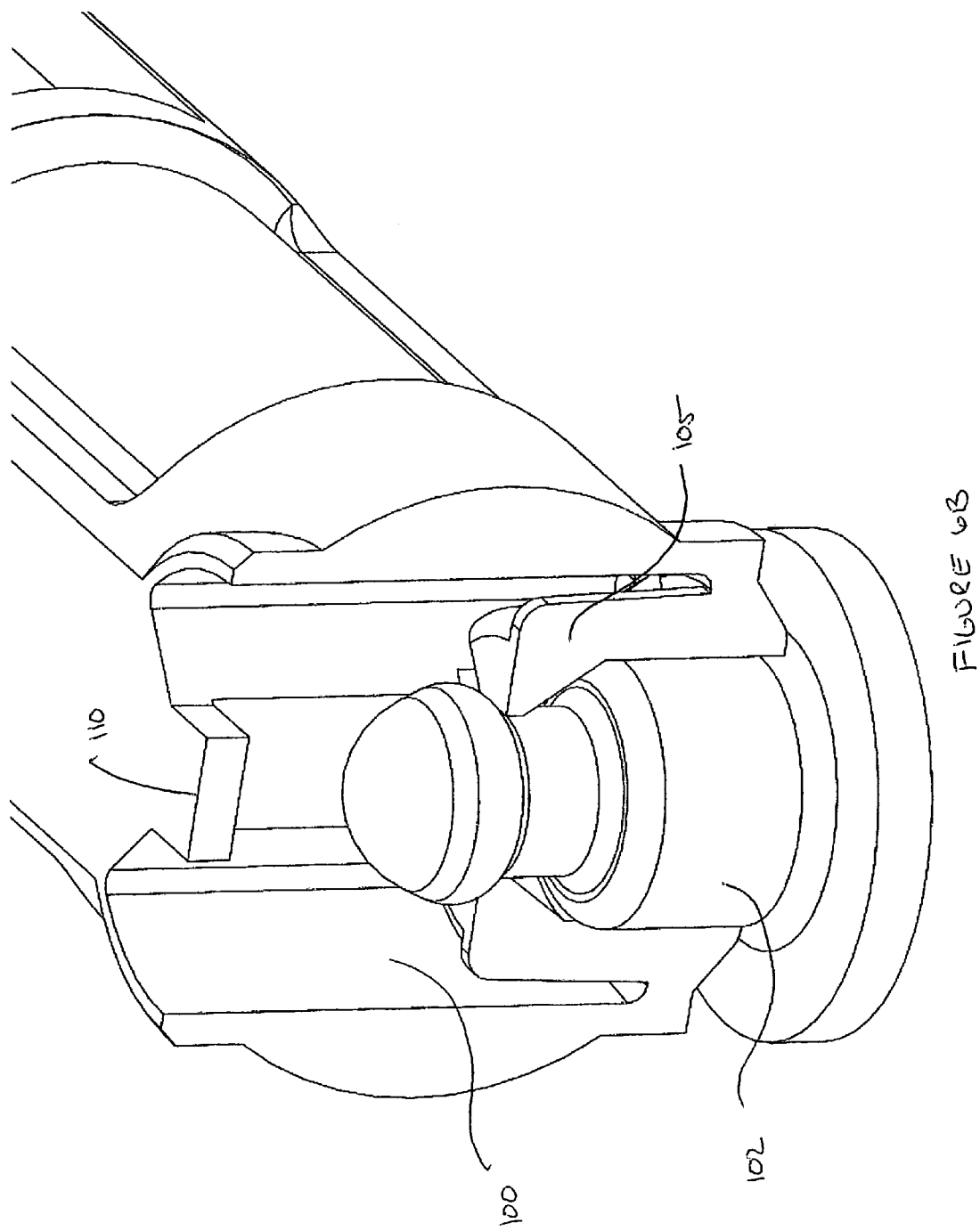

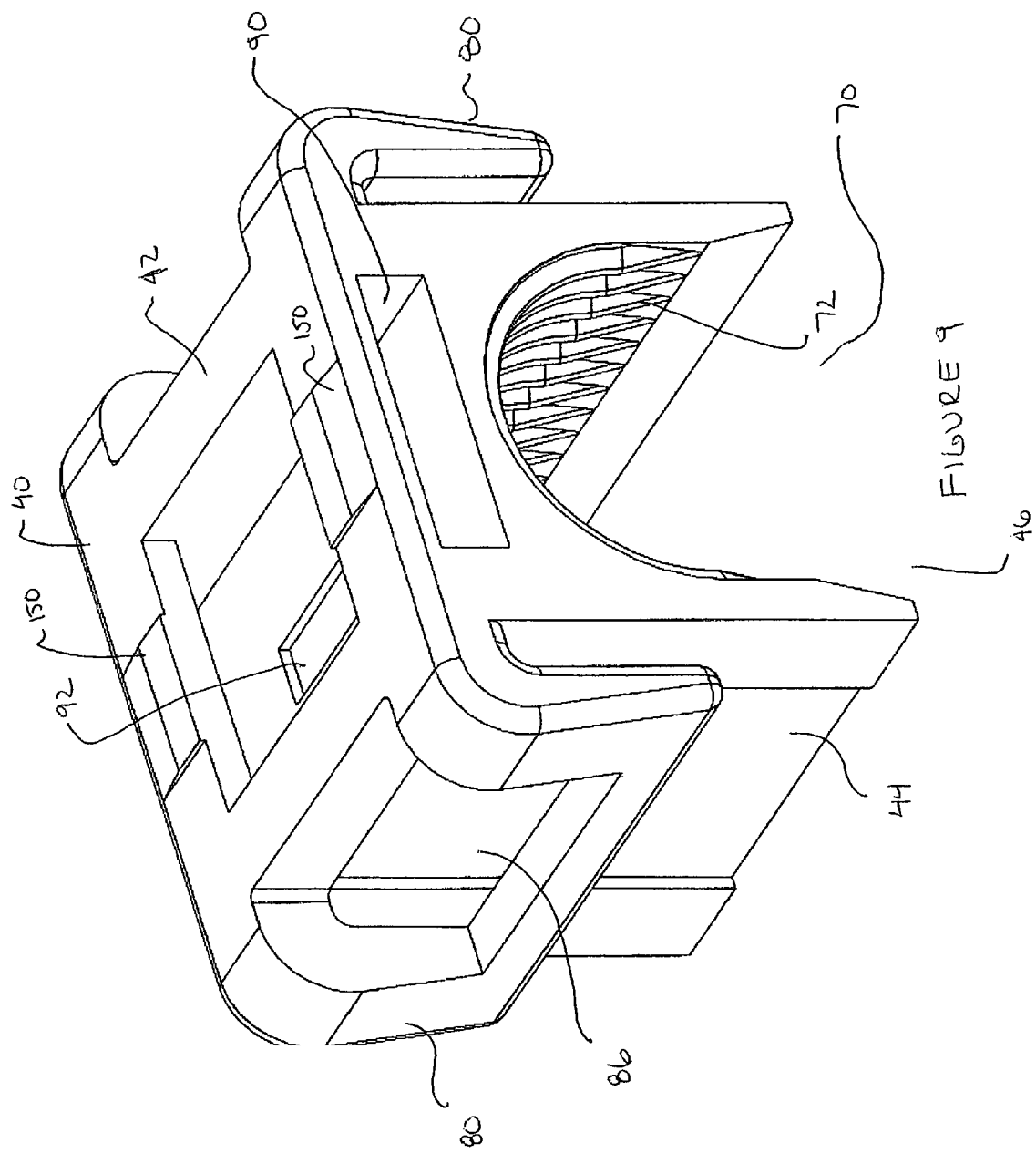

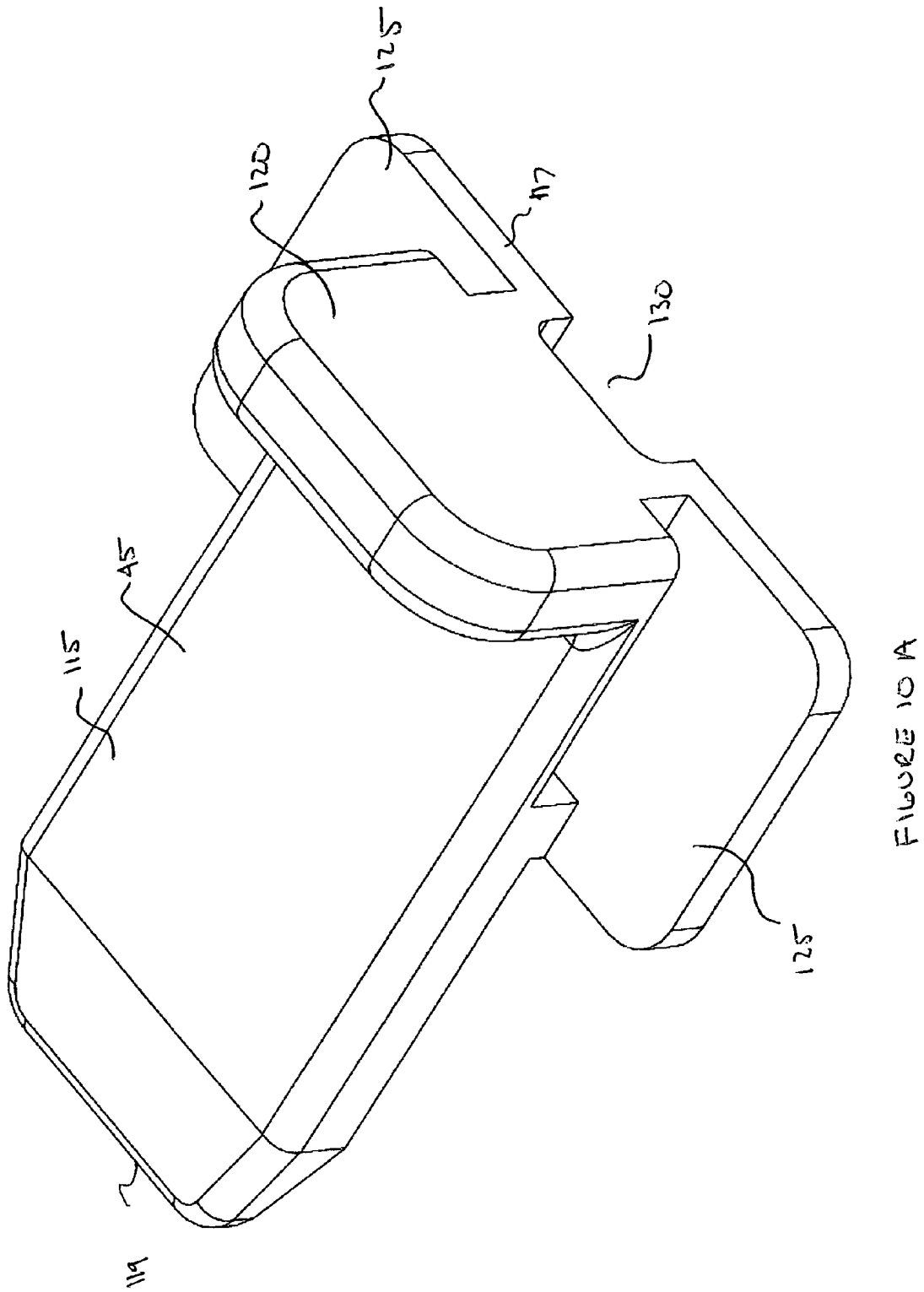

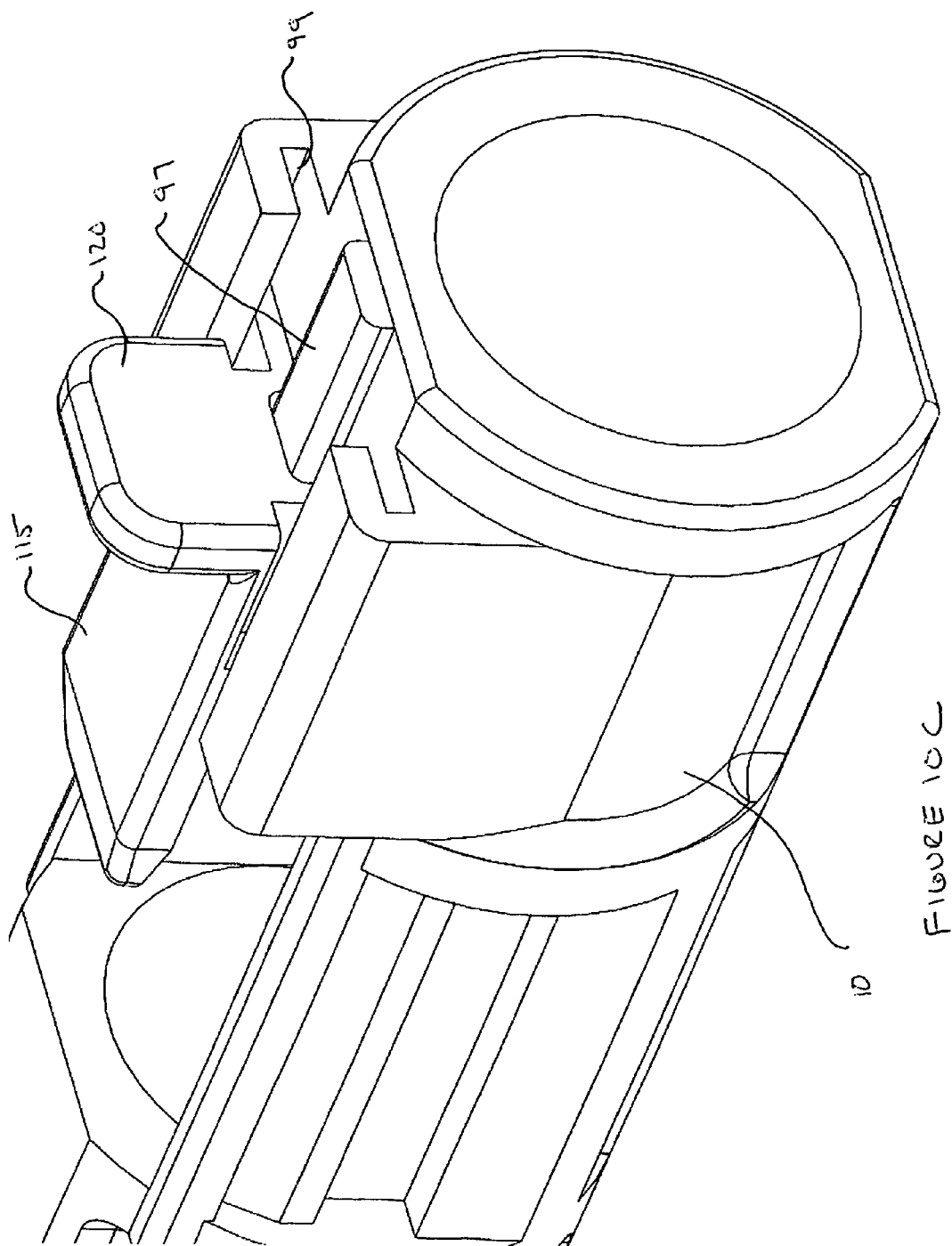

_US 7,779,720 B2_

COMPACT CORE ADJUSTER WITH VIBRATION DAMPENING

RELATED APPLICATIONS

This application claims priority of U.S. Patent Provisional Application Ser. No. 60/672,336 filed Apr. 18, 2005 which is incorporated herein by reference.

FIELD OF THE INVENTION

The invention relates to core adjusters, and more particularly to vibration dampened core adjusters.

BACKGROUND OF THE INVENTION

Core adjuster assemblies are commonly utilized in control cable assemblies used in motion-transmitting push-pull applications. Such assemblies are widely used in automotive applications, such as with control cables in various applications. The core adjuster assemblies compensate for variation in distances between mounting points by adjusting the length of the core element.

In order to facilitate installation of a cable assembly in a vehicle it is important to adjust the length of the core wire so as to provide a precise core wire length. Various prior art adjusters have been disclosed to adjust a length of a control cable. However the prior art does not include a core adjuster assembly with satisfactory dampening characteristics that avoid lash in a cable system. Further, prior art cable adjusters do not provide an ergonomic and well packaged connection with a pin to adjust the length of the cable. Additionally, prior art adjusters do not include a satisfactory mechanism for maintaining the adjuster in a pre-installed shipping position and in an installed locked position. There is therefore a need in the art for an improved adjuster that solves the limitations of the prior art.

SUMMARY OF THE INVENTION

A core adjuster assembly includes an adjuster body having a pin engagement end and a locking end. The adjuster body has a central longitudinal bore and a lock cavity formed through an outer peripheral surface. A slider body is formed on an end of a rod and is disposed in the central longitudinal bore of the adjuster body. A primary lock member is disposed in the lock cavity and is moveable from a shipping position to a locked position. A secondary lock member is associated with the adjuster body and the primary lock member and is adapted to maintain the primary lock member in the shipping and locked positions.

DESCRIPTION OF THE DRAWINGS

FIG. 6B is a cutaway perspective view of the adjuster body detailing the pin installed in the adjuster body;

FIG. 9 is a perspective view of the primary lock member of the core adjuster assembly of the present invention;

FIG. 10A is a perspective view of the secondary lock member of the core adjuster assembly;

FIG. 10C is a perspective view of the secondary lock member installed on the adjuster body;

DESCRIPTION OF THE INVENTION

Figure 2:
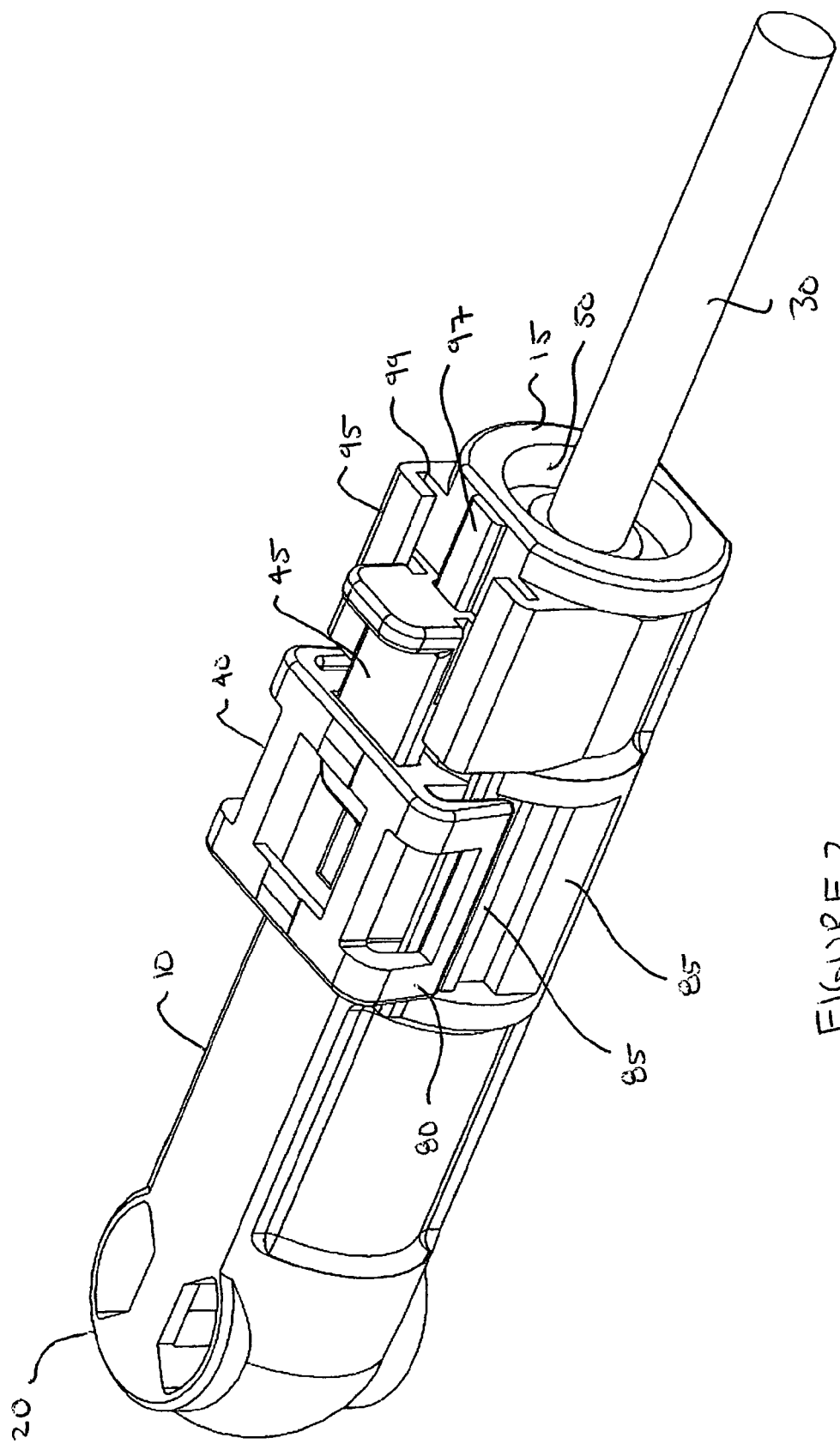
FIG. 2 is a perspective view of a core adjuster assembly with the primary lock member in the shipping position.
Figure 3:
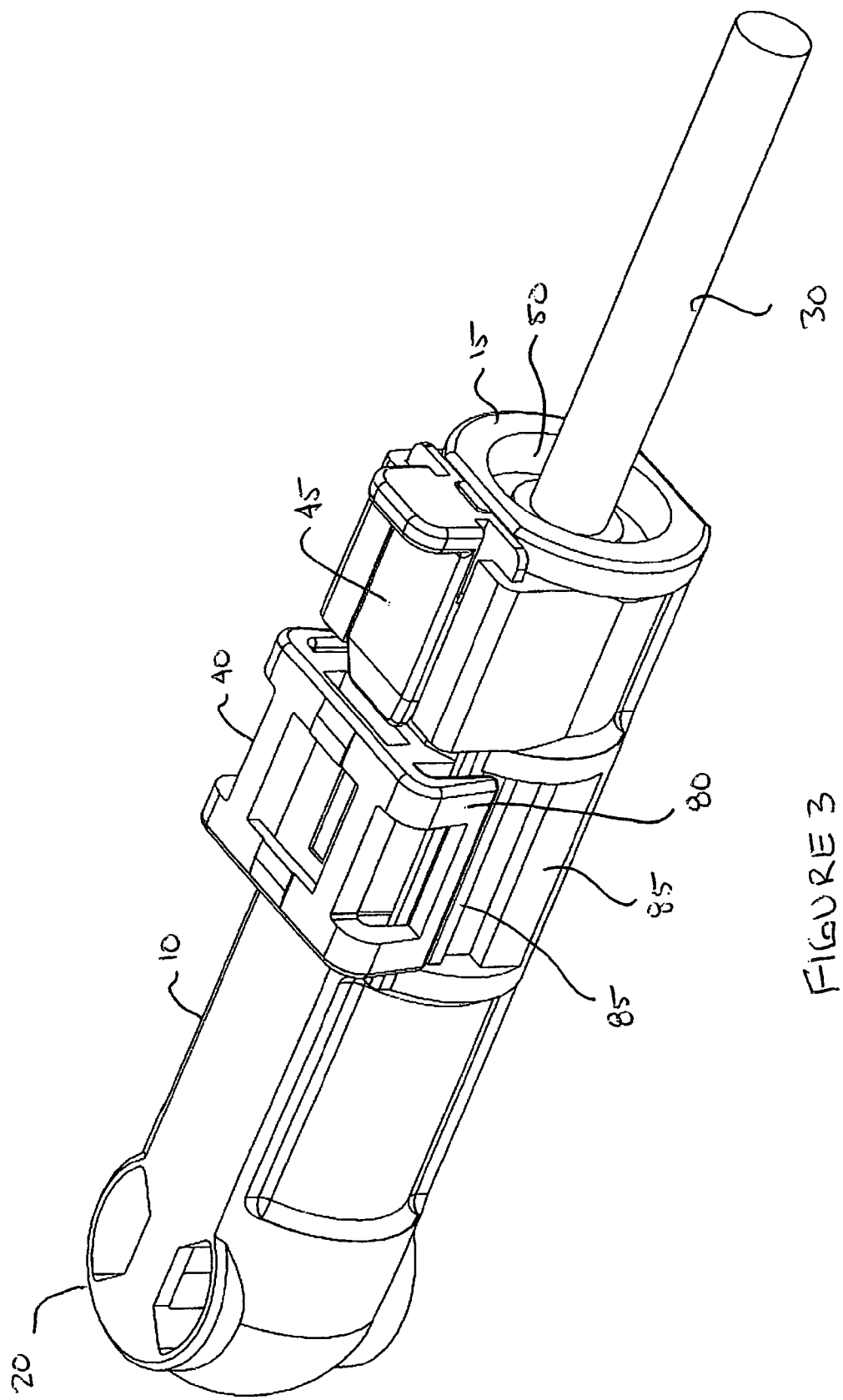
FIG. 3 is a perspective view of a core adjuster assembly with the primary and secondary locks separated prior to locking the primary lock member.

Referring to FIGS. 2 and 3, there is shown a core adjuster assembly 5 in accordance with the present invention. The core adjuster assembly 5 includes an adjuster body 10 having a locking end 15 and a pin engagement end 20. The core adjuster assembly 5 also includes a slider body 25 formed on an end of a rod 30 having an isolator material 35 associated therewith. The slider body 25 is inserted inside the adjuster body 10 at the locking end 15 of the adjuster body 10. Primary and secondary lock members 40, 45 are associated with the adjuster body 10 to maintain the slider body 25 in a fixed position relative to the adjuster body 10 after an appropriate tension or length in a cable system has been achieved.

The adjuster body 10 includes a central bore 50 that extends from the locking end 15 to the pin engagement end 20. The central bore 50 receives the slider body 10, as previously described above. The central bore 50 may receive a biasing spring 55 positioned between the pin engaging end 20 and the slider body 25 for biasing the slider body 25 and the adjuster body 10 apart.

The locking end 15 of the adjuster body 10 includes a slot 60 formed through a top of an outer peripheral surface. The slot 60 defines a lock cavity 65. The primary lock member 40 is received within the lock cavity 65 and is adjustable to engage and disengage the slider body 10 for adjusting a position of a core wire of a cable system.

Referring to FIG. 9, there is shown the primary lock member 40 of the core adjuster assembly 5. The primary lock member 40 is a generally rectangular shaped body having top 42 and side surfaces 44 with an open bottom 46. A lock slot 70 is formed centrally therein extending from the body toward the open bottom 46. In one aspect, the lock slot 70 is horseshoe shaped and includes engagement teeth 72 formed on an inner surface 74 of the lock slot 70 for engaging corresponding teeth 75 formed on the slider body 25. The primary lock member 40 includes snap prongs 80 formed thereon. The snap prongs 80 extend from the top surface 42 outwardly toward the side surfaces 44 and angle downward. The snap prongs 80 are designed to engage notches 85 formed on the adjuster body 10. The snap prongs 80 may include an extraction assist feature, such as a slot 86 to allow the snap prongs 80 to be engaged and disengaged allowing adjustment of the primary lock member 40 relative to the adjuster body 10 or the snap prongs 80 may extend downward a greater distance for access. The primary lock member 40 includes a pocket 90 formed proximate the top surface 42 of the lock member 40 extending from a front of the lock member 40 to a rear of the lock member 40. The pocket 90 is sized to receive the secondary lock member 45, as will be discussed in more detail below. In one aspect, the pocket 90 includes a channel 92 formed in a bottom surface of the pocket 90 for engaging the secondary lock member 45 at the tab 135.

Figure 5:
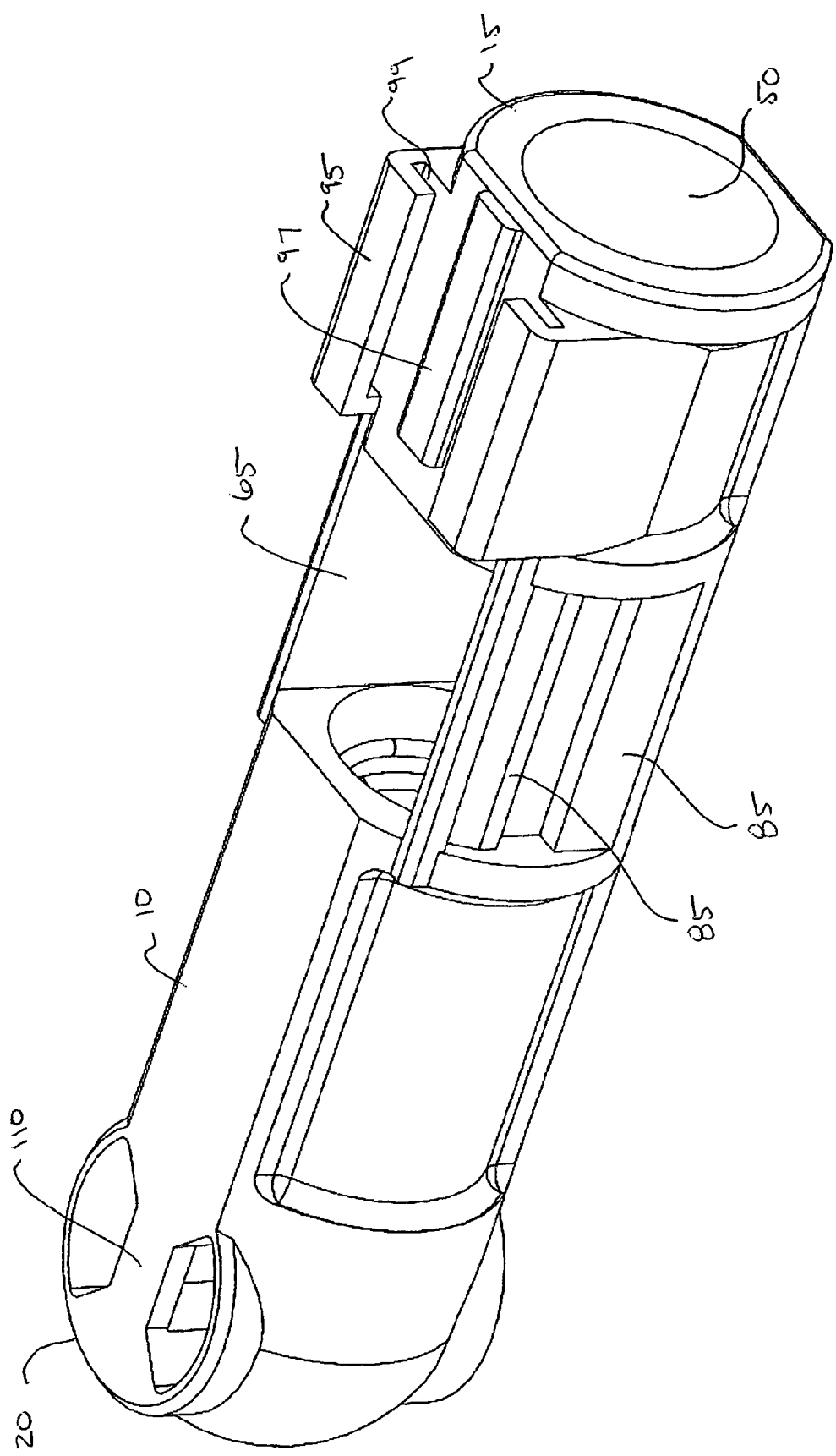
FIG. 5 is a perspective view of the adjuster body of the core adjuster assembly.
Figure 6A:
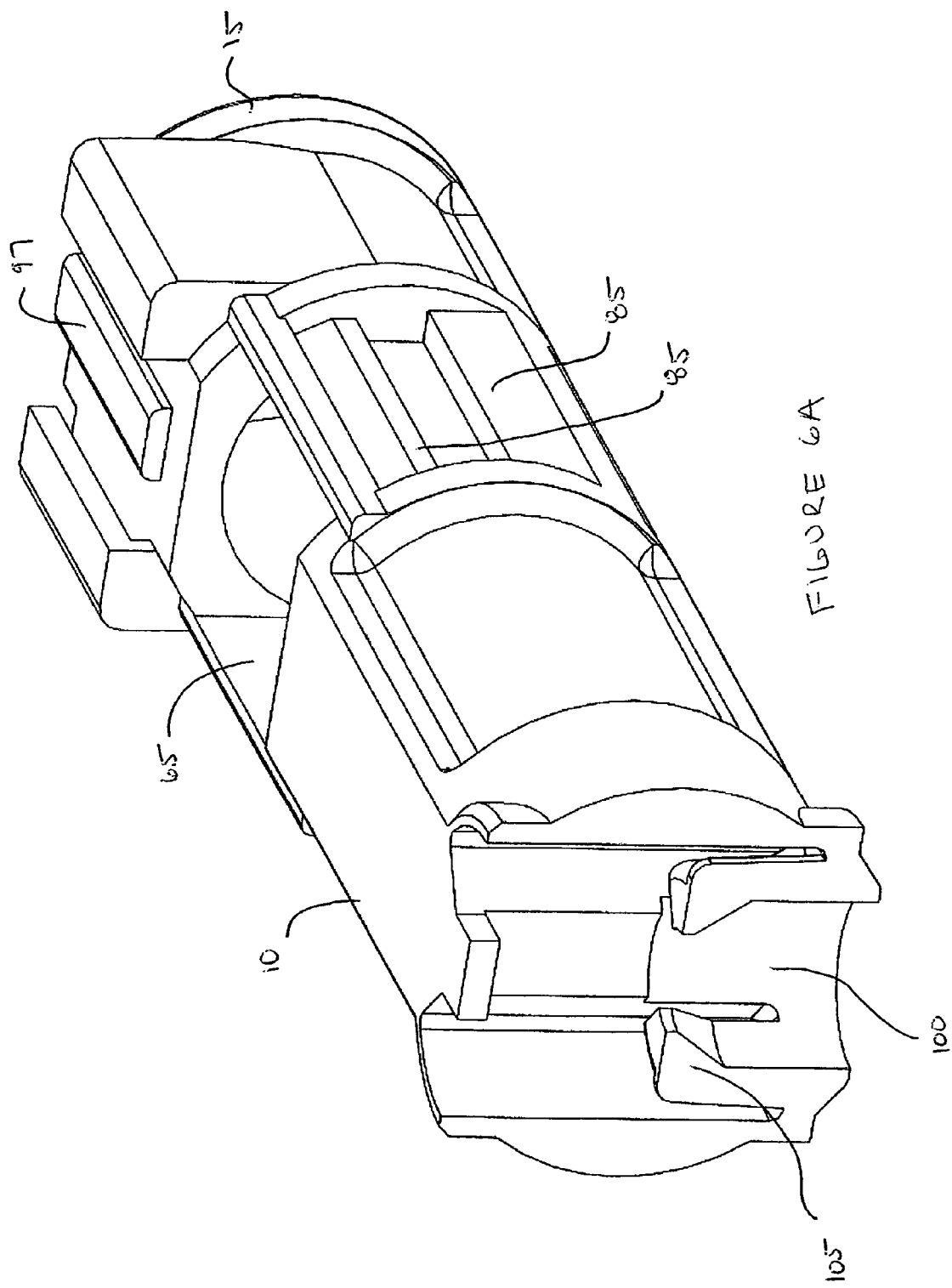
FIG. 6A is a cutaway perspective view of the adjuster body detailing the pin engagement end of the adjuster body.

Referring to FIG. 5, there is shown the adjuster body 10 of the core adjuster assembly 5 of the present invention. As stated above, the adjuster body 10 includes a locking end and a pin engaging end 15, 20. The locking end 15 includes guide features 95 formed thereon for engaging the secondary lock member 45. The guide features 95 include a raised track 97 and slots 99 for engaging the secondary lock member 45. The adjuster body 10 also includes locking notches 85 formed on an outer surface proximate the lock cavity 65. The notches 85 are designed to engage the snap prongs 80 of the primary lock member 40 to maintain the primary lock member 40 in either a shipping or locked position. The pin engaging end 20 of the adjuster body 10 includes a recess 100 formed on a bottom surface and adapted to engage a pin 102. The recess 100 includes engagement prongs 105 that snap around the pin 102 to securely retain it within the recess 100. Additionally, the pin engagement end 20 includes an orientation feature 110 formed on the top surface, preventing insertion of the pin 102 from the top surface.

Figure 7:
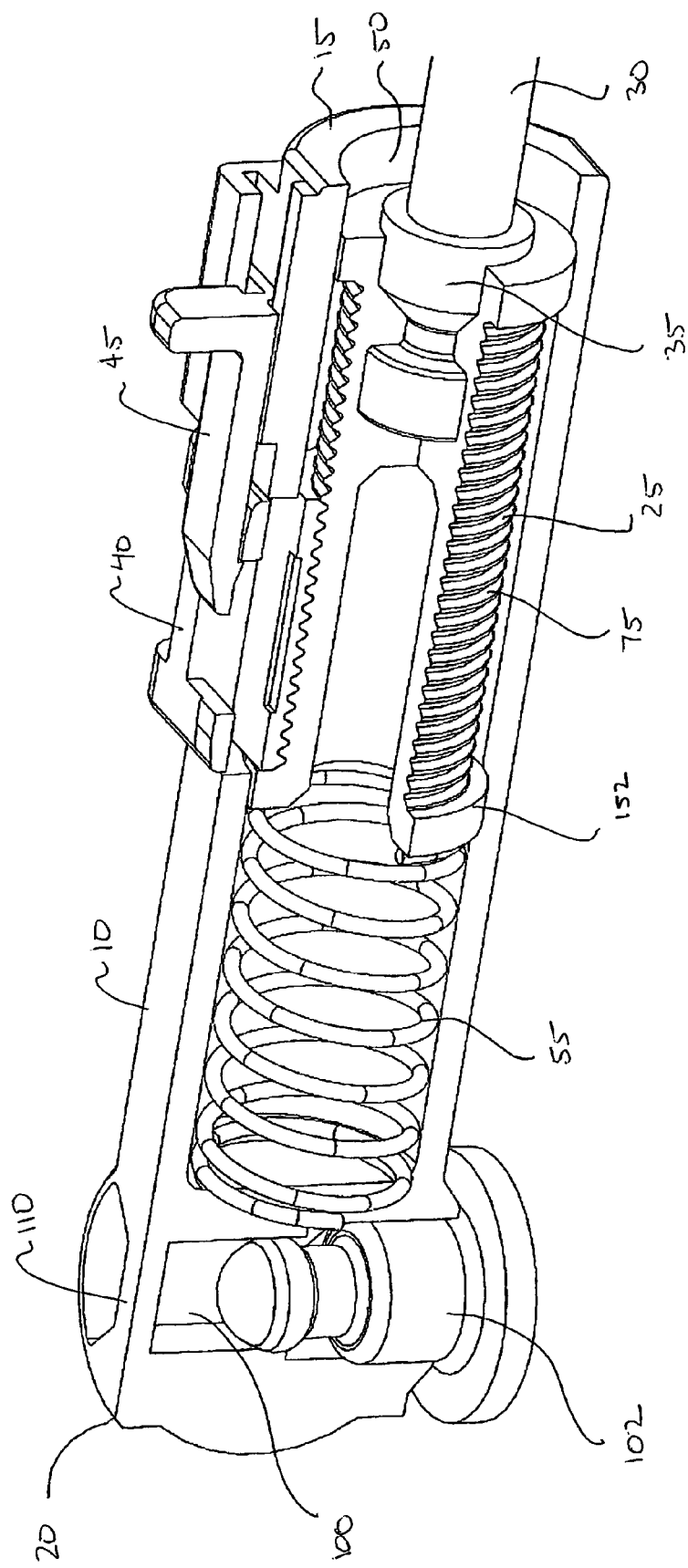
FIG. 7 is a cutaway perspective view detailing the core adjuster assembly of the present invention.
Figure 8:
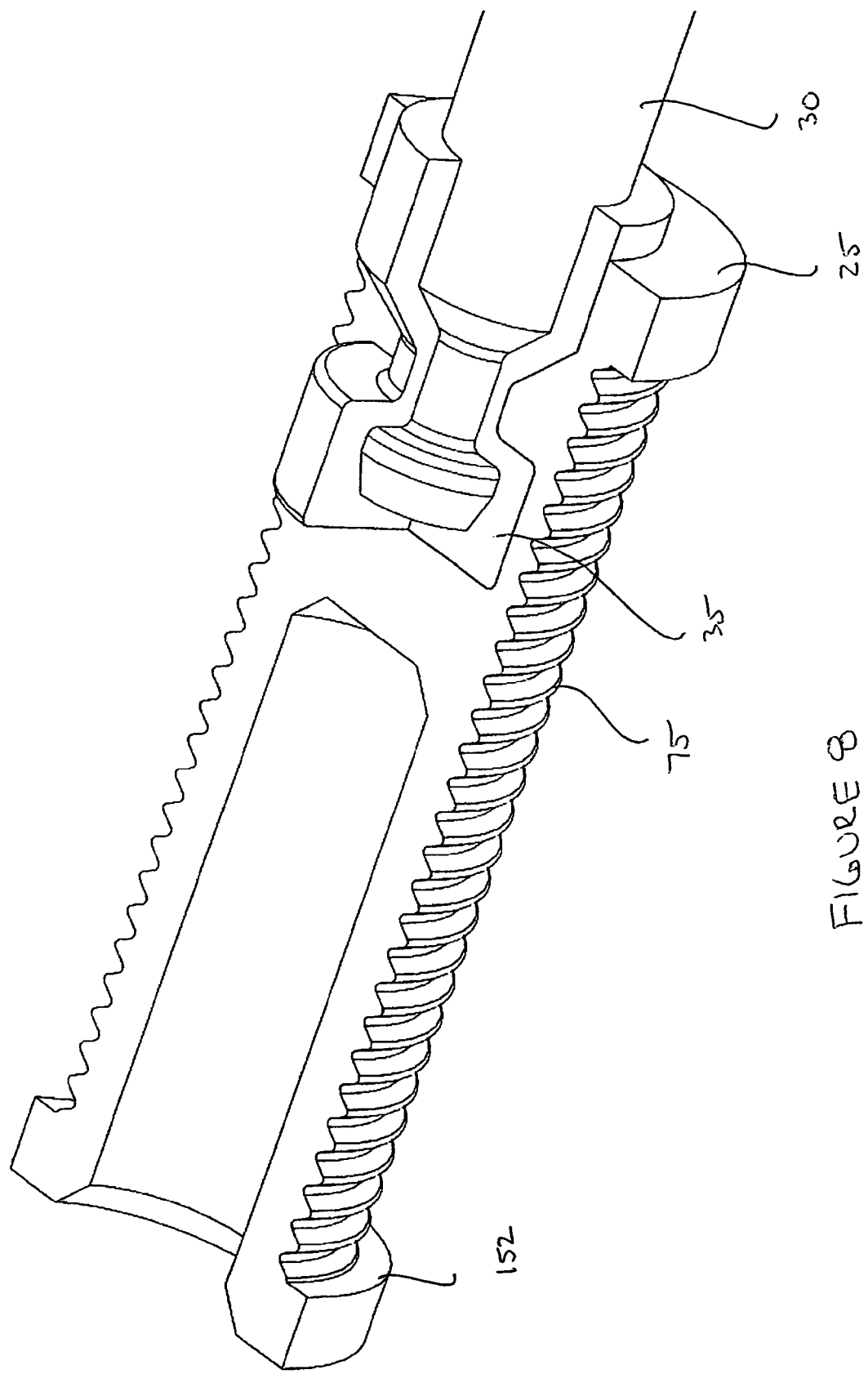
FIG. 8 is a perspective view of a slider body coupled to a rod including an isolator associated with the core adjuster assembly of the present invention.

Referring to FIGS. 7 and 8, there is shown the slider body 25 of the core adjuster assembly 5 of the present invention. The slider body 25 may be a molded member formed on a rod 30 which is connected to a core wire of a cable assembly. The slider body 25 includes a generally cylindrical body having teeth 75 formed on an outer surface, adapted to engage the teeth 72 formed on the primary lock member 40. An isolator material 35 is formed on an end of the rod 30 proximate a coupling area 32 for dampening vibration within the core adjuster assembly 5. The isolator material 35 is formed on the rod 30 with subsequent molding of the slider body 25 such that the slider body 25 and isolator material 35 are integrally formed with the rod 30. In one aspect of the present invention, the isolator material 35 is supplied at a relatively thin thickness reducing lash within the core adjuster assembly 5 while still maintaining adequate vibration dampening characteristics. In one aspect of the present invention, the thickness may be from 0.5 to 2.5 millimeters. The positioning of the isolator material 35 for dampening vibrations on the rod 30 associated with a core wire allows for removal of isolator material typically associated and used on a pin engaging portion of a core adjuster assembly. By removing the isolator material from the pin adjusting end, lash associated with a core adjuster system is greatly reduced. Additionally, the insertion and extraction forces for snapping the pin 102 into the recess 100 can be better controlled; thereby improving the assembly process.

Figure 10B:
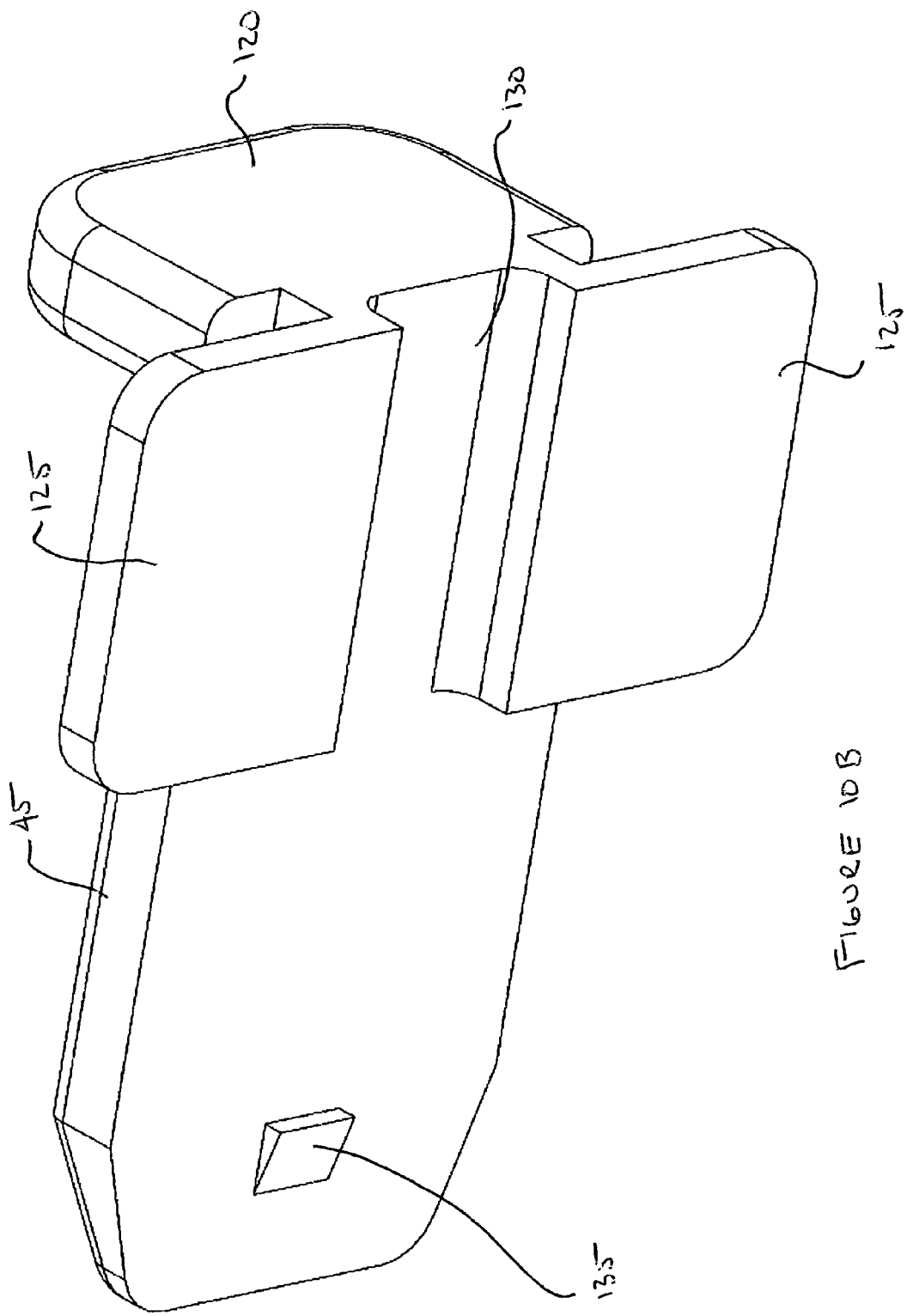
FIG. 10B is a perspective view of the secondary lock member of the core adjuster assembly.
Figure 10D:
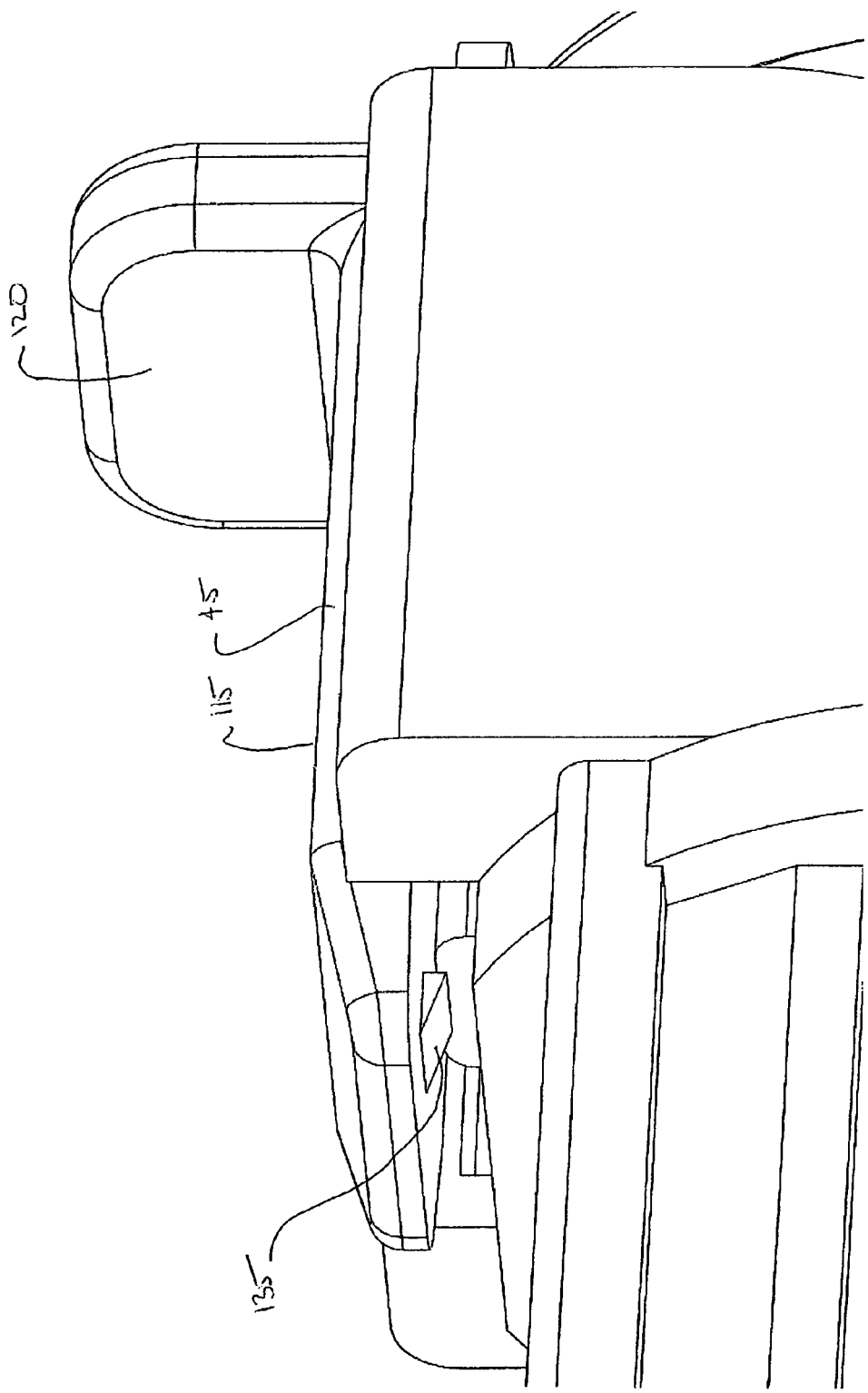
FIG. 10D is a partial perspective view of the snap feature of the secondary lock member.

Referring to FIGS. 10A and 10B, there is shown the secondary lock member 45 of the core adjuster assembly 5. The secondary lock member 45 includes a central extension portion 115 having first and second ends 117, 119. A push-pull tab 120 extends upward at the first end 117 of the central portion 115. Additionally, guide wings 125 extend laterally outward from a bottom surface at the first end 117 of the central portion 115. A guide slot 130 is formed and defined between the guide wings 125 for riding along the raised track 97 formed on the locking end 15 of the adjuster body 10. The bottom surface of the central extension portion 115 includes a snap feature 135 formed thereon for engaging the slot 92 in the shipping position or the ramps 150 in the locked position to maintain the secondary lock member 45 in position when the primary lock member 40 is in the shipping or locked positions. Additionally, the snap feature 135 rides within the channel 92 formed on the bottom surface of the pocket 90 of the primary lock member 40, as described above.

Figure 1:
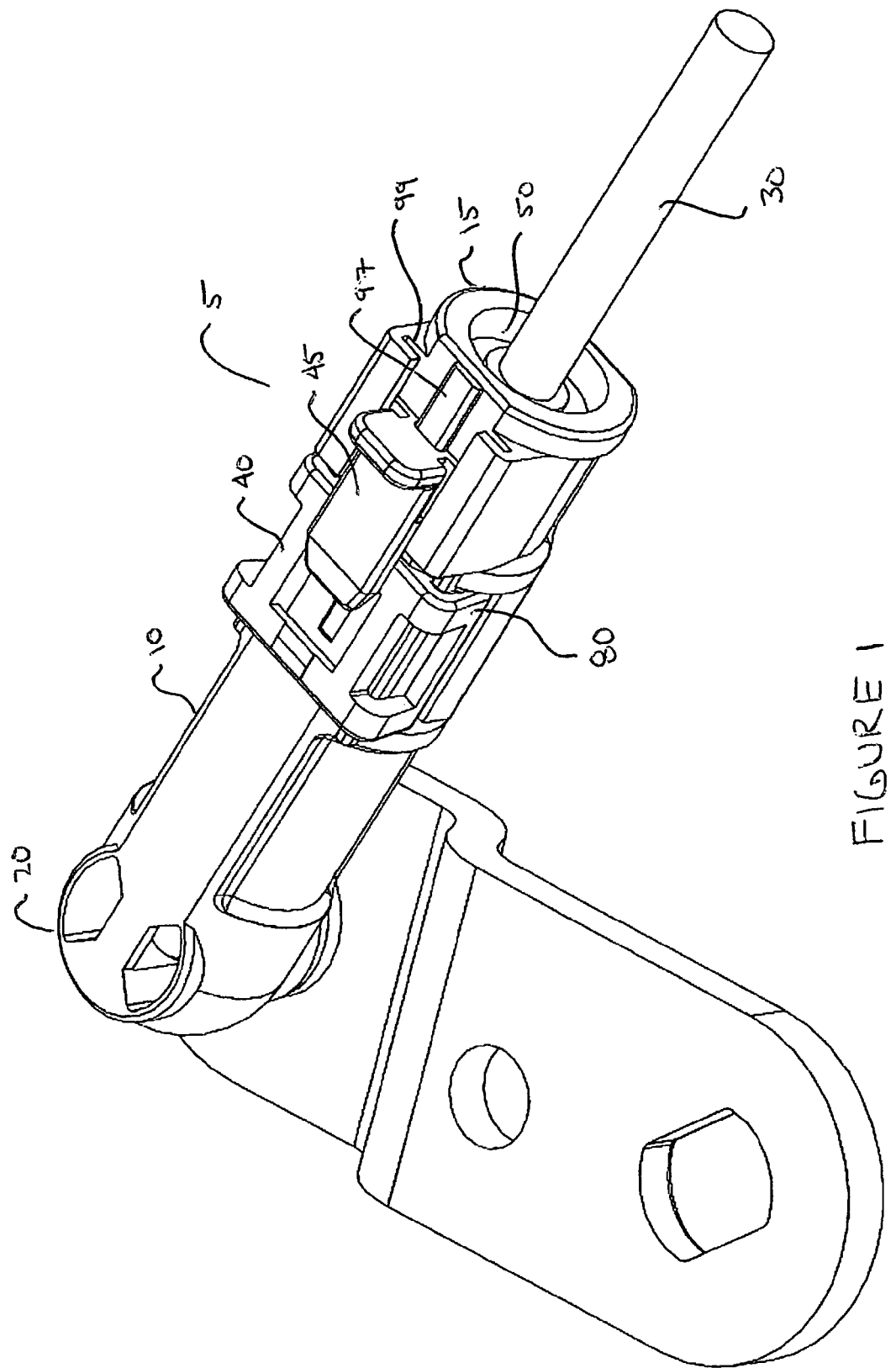
FIG. 1 is a perspective view of a core adjuster assembly attaching to a lever associated with a transmission with the core adjuster in a locked position.
Figure 4:
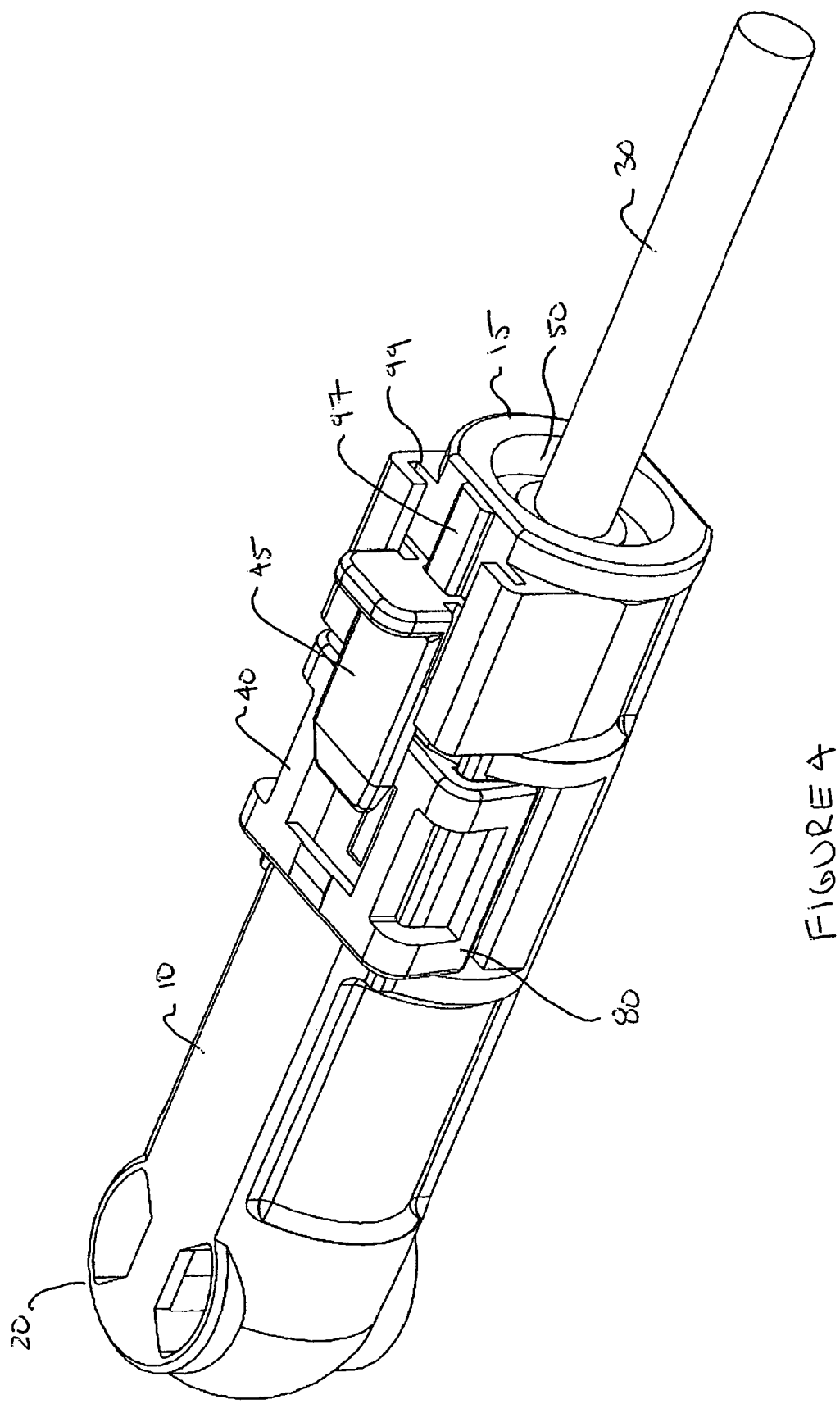
FIG. 4 is a perspective view of the core adjuster assembly with the primary lock in the locked position.
Figure 11A:
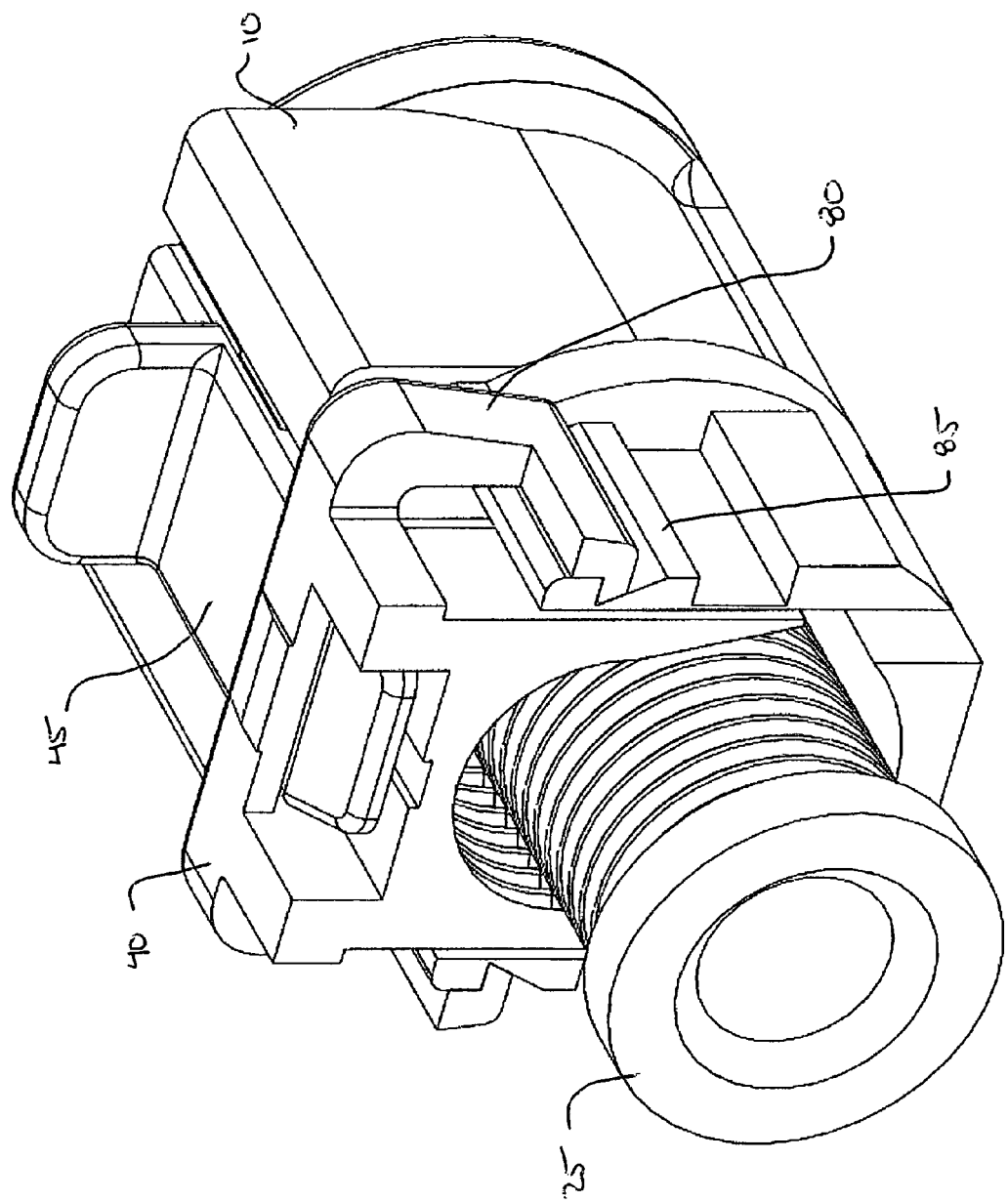
FIG. 11A is a perspective view of the primary and secondary lock members in the shipping position.
Figure 11B:
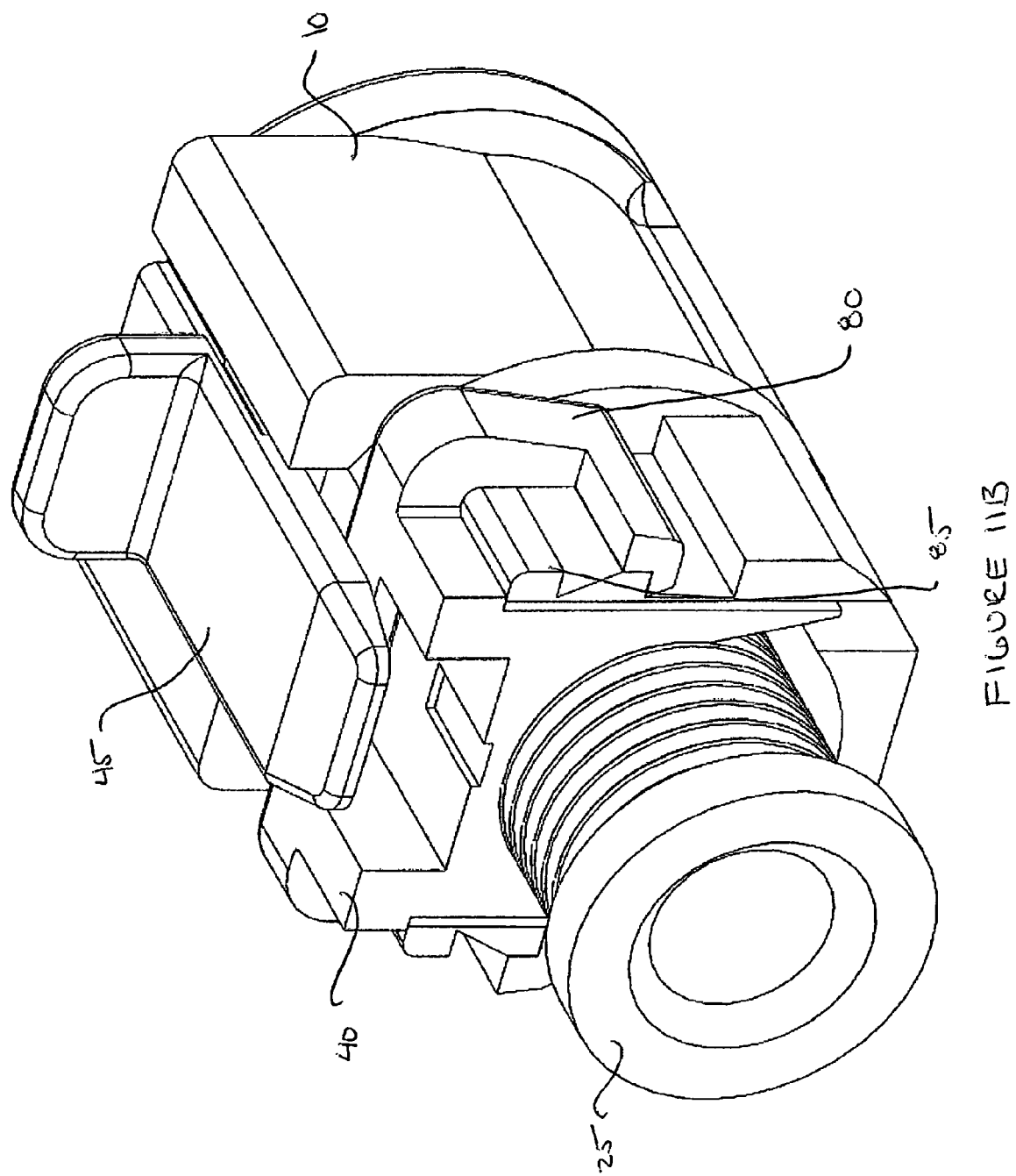
FIG. 11B is a perspective view of the primary and secondary lock members in the locked position.

In use, the core adjuster assembly 5 is movable from a shipping position, as best seen in FIGS. 2 and 11A to a locked position, as best seen in FIGS. 1, 4 and 11B. The slider body 25 and rod 30 are designed to fit within the central bore 50 of the adjuster body 10. A spring 55 can be inserted within the central bore 50 of the adjuster body 10 to bias the slider body 25 relative to the adjuster body 10 if necessary. The primary lock member 40 is then inserted within the lock cavity 65 such that the snap prongs 80 formed on the primary lock member 40 engage the notches 85 associated with the shipping position. The secondary lock member 45 is positioned within the guide features 95 of the locking end 15 of the adjuster body 10 such that the secondary lock member is received within the pocket 90 of the primary lock member 40. The central extension portion 115 of the secondary lock member 45 travels in the pocket 90, while the secondary lock member 45 is guided within the slots 99 and track 97 formed on the adjuster body 10. The snap feature 135 formed on the bottom surface of the secondary lock member 45 is received within the channel 92 formed in the pocket 90 of the primary lock member 40. The secondary lock member 45 prevents the primary lock member 40 from being removed from the lock cavity 65, as well as prevents the primary lock member 40 from being moved to the locked position. In this manner, the slider body 25 is able to be moved within the central bore 50 formed in the adjuster body 10, such that a tension or length of a core wire can be adjusted freely while the lock members cannot be disassembled from the core adjuster assembly 5.

Referring to FIG. 3, the core adjuster assembly 5 can be moved to the locked position by movement of the secondary lock member 45 out of the pocket 90 formed in the primary lock member 40 allowing the primary lock member 40 to be pushed downward into the lock cavity 65, such that the locking prongs 80 engage the notches 85 associated with the locking position. Prior to pushing the primary lock member 45 into the lock cavity 65, a ring formation 152 formed on the slider body 25 prevents the slider body 25 from moving completely out of contact with the primary lock member 45. After the primary lock member 40 has been pushed downward into the lock cavity 65 formed in the adjuster body 10, the secondary lock member 45 may then be pushed forward, as shown in FIGS. 4 and 9, such that the locking feature 135 formed on the bottom surface travels across a ramp 150 formed on a top surface of the primary lock member 40 over an edge, such that the secondary lock member 45 engages the primary lock member 40 to prevent movement of the primary lock member 40. In this position, the teeth 72 formed on the primary lock member 40 engage the teeth 75 formed on the slider body 25 maintaining the slider body 25 in a fixed position relative to the adjuster body 10.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A core adjuster assembly comprising:
   an adjuster body having a pin engagement end and a locking end, the adjuster body including a central longitudinal bore and a lock cavity formed through an outer peripheral surface;
   a slider body formed on an end of a rod, the slider body disposed in the central longitudinal bore;
   a primary lock member disposed in the lock cavity, the primary lock member moveable from a shipping position to a locked position;
   a secondary lock member associated with the adjuster body and the primary lock member, the secondary lock member adapted to maintain the primary lock member in the shipping and locked positions;
   wherein the pin engaging end of the adjuster body includes a recess formed on a bottom surface and adapted to engage a pin, the recess including engagement prongs that snap around the pin to securely retain it within the recess.

2. The core adjuster assembly of claim 1 wherein the slider body includes an isolator material formed on an end of the rod, the isolator material having a thickness sized to reduce lash associated with the core adjuster assembly.

3. The core adjuster assembly of claim 2 wherein the isolator material is formed on the rod with subsequent molding of the slider body such that the slider body and isolator material are integrally formed with the rod.

4. The core adjuster assembly of claim 2 wherein the thickness is from 0.5 to 2.5 millimeters.

5. The core adjuster assembly of claim 1 including a biasing spring disposed in the central longitudinal bore of the adjuster body for biasing the slider body and adjuster body apart.

6. The core adjuster assembly of claim 1 wherein the primary lock member includes a rectangular shaped body having top and side surfaces with an open bottom.

7. The core adjuster assembly of claim 6 wherein the primary lock member includes a lock slot formed centrally therein and extending from the top surface toward the open bottom, the lock slot including engagement teeth formed on an inner surface of the lock slot for engaging corresponding teeth formed on the slider body.

8. The core adjuster assembly of claim 6 wherein the primary lock member includes snap prongs formed thereon, the snap prongs extend from the top surface outwardly toward the side surfaces and angling downward.

9. The core adjuster assembly of claim 8 wherein the snap prongs engage notches formed on the adjuster body.

10. The core adjuster assembly of claim 9 wherein the snap prongs include an extraction assist feature to allow the snap prongs to be engaged and disengaged with the notches allowing adjustment of the primary lock member relative to the adjuster body.

11. The core adjuster assembly of claim 6 wherein the primary lock member includes a pocket formed proximate the top surface of the lock member extending from a front of the lock member to a rear of the lock member, the pocket sized to receive the secondary lock member.

12. The core adjuster assembly of claim 11 wherein the pocket includes a channel formed in a bottom surface of the pocket for engaging the secondary lock member.

13. The core adjuster assembly of claim 1 wherein the locking end of the adjuster body includes guide features formed thereon for engaging the secondary lock member, the guide features including a raised track and slots for engaging the secondary lock member.

14. The core adjuster assembly of claim 1 wherein the pin engagement end includes an orientation feature formed on the top surface, preventing insertion of the pin from the top surface.

15. The core adjuster assembly of claim 1 wherein the secondary lock member includes a central extension portion having first and second ends and a push-pull tab extending upward at the first end of the central portion.

16. The core adjuster assembly of claim 15 wherein the secondary lock member includes guide wings extending laterally outward from a bottom surface at the first end of the central portion and a guide slot formed and defined between the guide wings for riding along a raised track formed on the locking end of the adjuster body.

17. The core adjuster assembly of claim 16 wherein the bottom surface of the central extension portion includes a snap feature formed thereon for engaging an end surface of the adjuster body to maintain the secondary lock member in position when the primary lock member is in the shipping or locked positions.

18. The core adjuster assembly of claim 17 wherein the snap feature rides within a channel formed on a bottom surface of a pocket of the primary lock member.

19. A core adjuster assembly comprising:
    an adjuster body having a pin engagement end and a locking end, the adjuster body including a central longitudinal bore and a lock cavity formed through an outer peripheral surface;
    a slider body formed on an end of a rod, the slider body disposed in the central longitudinal bore;
    a primary lock member disposed in the lock cavity, the primary lock member moveable from a shipping position to a locked position;
    a secondary lock member associated with the adjuster body and the primary lock member, the secondary lock member adapted to maintain the primary lock member in the shipping and locked positions;
    the slider body including an isolator material formed on an end of the rod, the isolator material positioned inside the slider body, the isolator material having a thickness sized to reduce lash associated with the core adjuster assembly.

20. A core adjuster assembly comprising:
    an adjuster body having a pin engagement end and a locking end, the adjuster body including a longitudinal bore and a lock cavity formed through an outer peripheral surface;
    a slider body formed on an end of a rod, the slider body disposed in the longitudinal bore;
    at least one lock member disposed in the lock cavity and moveable from a shipping position to a locked position; and
    wherein the slider body includes an isolator material formed on an end of the rod, the isolator material positioned inside the slider body, the isolator material having a thickness sized to reduce lash associated with the core adjuster assembly.

* * * * *